R. I. SHORT.
TIRE RACK.
APPLICATION FILED JAN. 23, 1920.
1,377,733. Patented May 10, 1921.
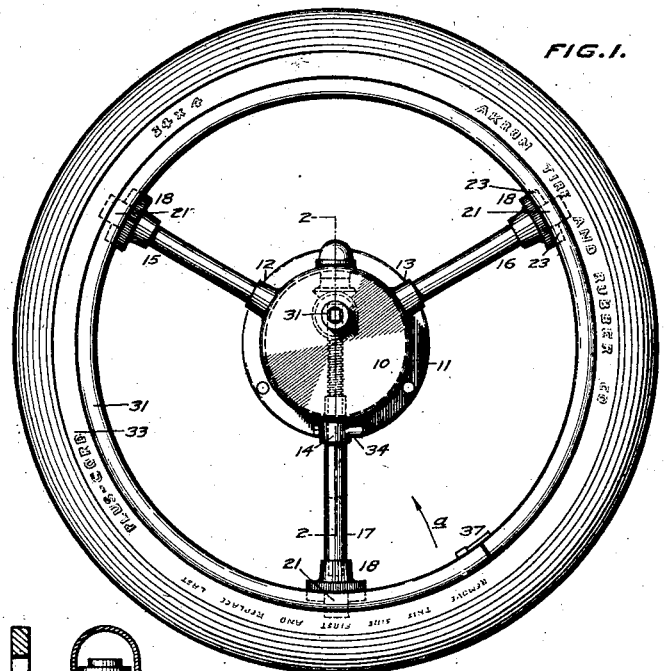
FIG. 1.
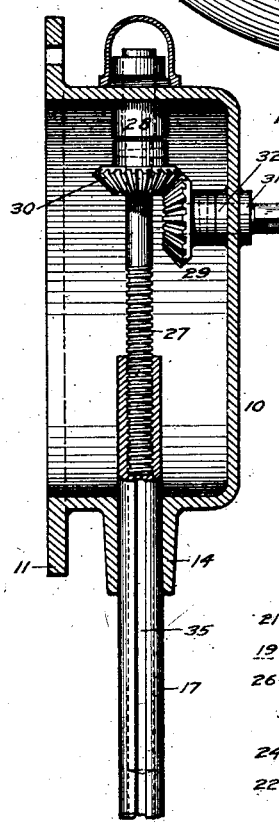
FIG. 2.
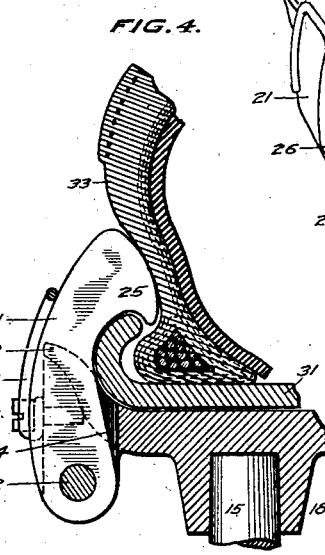
FIG. 3.
FIG. 4.
INVENTOR
RUEL I. SHORT
BY Chas. E. Townsend
ATTORNEY

UNITED STATES PATENT OFFICE.

RUEL I. SHORT, OF SAN FRANCISCO, CALIFORNIA.

TIRE-RACK.

1,377,733. Specification of Letters Patent. Patented May 10, 1921.

Application filed January 23, 1920. Serial No. 353,500.

*To all whom it may concern:*

Be it known that I, RUEL I. SHORT, a citizen of the United States, residing at city and county of San Francisco and State of California, have invented new and useful Improvements in Tire-Racks, of which the following is a specification.

This invention relates to a tire rack.

It is the principal object of the present invention to provide a tire rack to be permanently mounted upon an automobile and equipped with means whereby a tire rim and a spare tire may be carried therein, and means combined therewith for breaking the joint in a tire rim and contracting the rim sufficiently to permit a tire to be easily taken off or mounted upon this rim.

The present invention contemplates the use of a hub carrying radial arms and fixed at some convenient point upon an automobile, said arms being movable radially by suitable gearing, and equipped with seats upon which the rim may be clamped and jaw members by which the rim may be engaged and contracted.

The invention is illustrated by way of example in the accompanying drawings, in which:

Figure 1 is a view in side elevation showing the completely assembled rack carrying a tire and rim.

Fig. 2 is an enlarged view in central section through a portion of the rack as seen on the rack 2—2 of Fig. 1, and showing the adjusting mechanism of the extensible arm.

Fig. 3 is an enlarged view in perspective showing the rim seat carried by the arms and the catch member with which the movable arm is fitted.

Fig. 4 is an enlarged fragmentary view in section indicating the manner in which clencher or straight rimmed tires may be engaged and contracted.

Referring more particularly to the drawings, 10 indicates a cylindrical hub, the section formation of which is clearly shown in Fig. 2 of the drawings. This hub is provided with a circular flange 11 cast integral with its cylindrical body portion, the outer end of said body portion being closed. Bosses 12, 13, and 14 are cast integral with the cylindrical body portion of the hub and extending radially therefrom. These bosses are spaced equal distances from each other around the circumference of the hub and are adapted to receive arms 15, 16, and 17. The arms 15 and 16 extend upwardly and outwardly from the center of the hub at angles of 60 degrees to the vertical. The arm 17 extends downwardly and vertically and describes an angle of 120 degrees with each of the arms 15 and 16.

The arms 15 and 16 are preferably tubular and are equipped at their outer ends with seats 18. These seats are formed as more clearly shown in Fig. 3 of the drawings where they are shown to have an arcuate body portion, the opposite marginal edges of which are formed with flanges 19 and 20. These flanges coöperate in holding a tire rim 21 in position. The arm 17 is also equipped with a seat 18. These seats are each provided with a catch member 21. The catch members 21 are pivoted upon pins 22 extending through bosses 23. These bosses are cast integral with the side of the seat upon which flange 19 occurs. This flange is also cut away as indicated at 24 to permit the catch 21 to swing upwardly and over the body portion of the seat. The overhanging portion of this catch forms a hook 25 adapted to engage the outer flange of a tire rim whether this rim be of clencher or straight side type. A spring 26 accommodates to normally hold the catch 21 in its innermost position.

The downwardly and vertically extending arm 17 is internally threaded to receive an adjusting screw 27 by the means of which the arm may be vertically reciprocated through the boss 14. The upper end of the screw is journaled within a bearing 28 and is thus held for rotation when operated by a driving pinion 29 in mesh with a second driving pinion 30. The driving pinion 30 is pinned onto the shank of the screw 27, while the driving pinion 29 is pinned to a shaft 31 extending through a bearing 32 in the end of the hub. The outer projecting end of the shaft is squared to receive a winding crank.

In operation of the present invention, the hub 10 is fixed upon a support with the arm 17 preferably extending downwardly and in a vertical position. A rim 31 carrying a tire 33 may be mounted upon the seats 18 of the arms 15, 16, and 17, after which the arm 17 may be forced outwardly to combine with the other arms in tightening the rim upon the seats. When the rim is securely fastened, the arm 17 may be locked by means of a key inserted into a lock barrel 34 as shown in Fig. 1. This will prevent the removal of the rim by unauthorized persons. When it is desired to remove the tire upon the rim or to interchange rims and tires, the arm 17 may be released from the locking mechanism 34 and thereafter the crank and the screw 27 may be rotated to retract the arm 17. It will be understood that the arm 17 does not rotate due to the action of a pin 34 projecting into the keyway 35 in the side of the arm. Before the retracting movement takes place it is necessary to make certain that the hook portion 25 of the catch 21 is firmly seated over the flanged edge of the rim where it will be held in position by the spring 26. As the retracting movement of the arm 17 is then brought about the hook 25 will engage the flange of the rim and draw it inwardly in the direction of the arrow —a— as indicated in Fig. 1. The arms 15 and 16 will, of course, remain immovable and their catches will tend to hold the main portion of the rim in its original position while drawing one end of the rim near the joint 37 inwardly to break the joint. When the rim has been sufficiently contracted it may be held in its contracted position while a tire is taken off and another put on. It will further be noted by referring to Fig. 4 that the action of the hook portion 25 of the catch on arm 17 will wedge the clencher bead of the tire away from its flange and thus assist in loosening the tire casing upon the rim and permitting a tire tool to be inserted between the bead and the flange. After the tire has been mounted upon the rim a reverse action of the gear mechanism may be brought about to force the arm 17 outwardly and restore the rim to its original circular formation.

It will thus be seen that the present device provides a simple tire rack equipped with rims for locking a tire rim upon the rack and further affords means for positively expanding and contracting the rim while holding it upon a rigid support.

While I have shown the preferred form of my invention as now known to me it will be understood that various changes in the combination, construction and arrangement of parts may be made by those skilled in the art without departing from the spirit of the invention as claimed.

Having thus described my invention, what I claim and desire to secure by Letters Patent is:

1. In a tire rack, a hub, a pair of upper divergent arms radiating from the hub and having their inner ends fixed thereto and having tire seats on their outer ends, a boss, a third arm having a longitudinal key-way slidable through the boss, a pin carried by the boss and engaged in the key-way, a rotatable screw in the hub, the inner end of the third arm having a threaded socket receiving the screw, a bevel gear on the screw, a bevel gear carried by the front of the casing and meshed with the first named bevel gear, and means whereby to operate the second named bevel gear.

2. In a tire rack, a hub, a pair of fixed supports on the hub for the tire rim, a support having one end slidably mounted in the hub and disposed between the fixed supports, combined unitary rim and tire engaging means borne by the movable support, and means to actuate the movable support away from the fixed supports thereby to break the joint in the tire rim and to simultaneously cause the clencher bead of the tire to be moved away from its flange.

3. In a tire rack, a pair of fixed supports, a movable support therebetween, combined unitary rim and tire engaging means borne by the movable support, and means to actuate the movable support away from the fixed supports thereby to break the joint in the tire rim and to cause the clencher bead of the tire to simultaneously be moved away from its flange.

4. In a tire rack, a pair of fixed supports, a movable support therebetween, spring pressed hooks pivoted to the supports and formed to engage over a flange of the rim to hold the latter against the supports, said hooks having head formations which impinge against the adjacent side of the tire to force the latter away from said flange, and means to actuate the movable support away from the fixed supports thereby to break the joint in the tire rim and to simultaneously cause the head of the hook to force the clencher bead away from said flange.

In testimony whereof I have hereunto set my hand in the presence of two subscribing witnesses.

RUEL I. SHORT.

Witnesses:
W. W. HEALEY,
M. E. EWING.